United States Patent [19]

Läike

[11] 3,713,218
[45] Jan. 30, 1973

[54] DEVICE FOR THE COOLING AND PRELIMINARY TREATMENT OF MILK FRESH FROM THE COW

[76] Inventor: Eero Läike, Kasarminkatu 1 A, Hameenlinna, Finland

[22] Filed: May 14, 1970

[21] Appl. No.: 37,222

[52] U.S. Cl. .............................. 31/4, 31/89, 99/19, 99/151, 99/183, 99/192 R, 119/14.09
[51] Int. Cl. ............................................. A01j 11/00
[58] Field of Search .......... 99/19, 151, 192; 31/4, 89; 119/14.09

[56] References Cited

UNITED STATES PATENTS

| | | | |
|---|---|---|---|
| 2,075,358 | 3/1937 | Reeves | 99/192 X |
| 1,991,733 | 2/1935 | Dean et al. | 99/192 X |
| 2,463,363 | 3/1949 | Dunkley | 99/151 |
| 1,813,050 | 7/1931 | Hauk | 31/4 X |
| 1,768,916 | 7/1930 | Lancaster | 31/4 X |
| 2,498,401 | 2/1950 | Duncan | 31/4 X |

Primary Examiner—S. Leon Bashore
Assistant Examiner—Frederick Frei
Attorney—Kurt Kelman

[57] ABSTRACT

Milk fresh from the cow is brought into contact with the cold walls of a vessel so that it flows therealong in the form of a thin membrane whereby it is cooled, and the cooled milk is collected in a sump at the bottom of the vessel, the feeding velocity of the milk into and out of the sump being adjustable.

7 Claims, 7 Drawing Figures

INVENTOR:
EERO LAIKE

INVENTOR:
EERO LAIKE

BY: Kurt Kelman

AGENT

DEVICE FOR THE COOLING AND PRELIMINARY TREATMENT OF MILK FRESH FROM THE COW

This invention relates to a device for the cooling of milk fresh from the cow.

All over the world methods are sought today for a profitable preliminary treatment of milk, which are suitable in any conditions in order to improve the quality of fresh milk, to simplify the treatment of milk on a farm, and to save labor and expense and to improve the level of technology and to develop the gathering of mild from tanks.

In the method according to this invention milk is first filtered by a filtration speed selected separately in each case of utilization and is the brought into contact with a cold surface. The new and particular fact is in the first place that the milk, thus preliminarily cooled, is then gathered into a bath, whereafter precooled milk is led from the bath at adjustable speed.

Other specialties and characteristics of the invention are described in the following by referring to the enclosed drawings, which illustrate two different embodiments of the milk cooling device according to the invention so that FIG. 1 shows schematically a vertical section of the milk cooling device according to a first embodiment.

Figure 1:
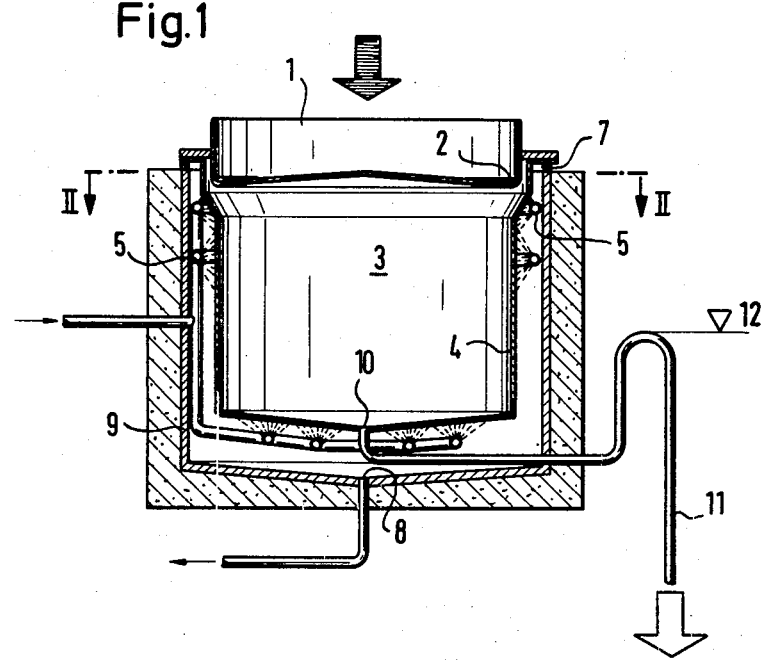
Figure 2:
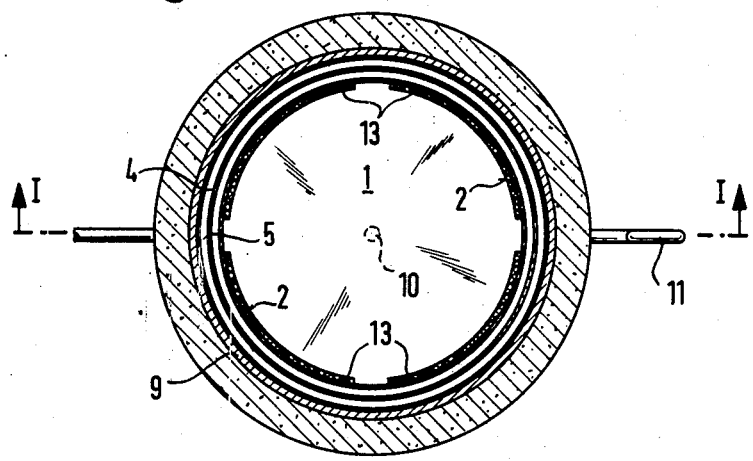
FIG. 2 shows a section of FIG. 1 along the line II—II.

The essential parts of the milk cooling device shown in the drawings consist of a cooling vessel 3 and of a cistern 1, tightly closing the open upper end of the cooling vessel, said cistern having at diametrically opposite lower edges narrow slits 2 essentially of the same length as this lower edge, as shown in FIGS. 1 and 2. A throw-away filter 13 is placed over the peripheral slits 2. The milk is poured into cistern 1, open at the top, from which cistern the milk, at the speed regulated by the selected perviousness of the filters 13, flows in a controlled stream through the slits 2 to the inner walls 4 of the vessel 3, and becomes a thin membrane, which can be given an undulating movement by corrugation of the wall 4 of the vessel 3. Such a corrugation will also stiffen the vessel, which can then be constructed with very thin walls, which also improves their heat transmission. Outside the vessel 3 detachable spray pipes 5 are placed, which spray the cooling liquid, such as ice water or other cooling liquid to the outer surfaces of the cooling vessel 3. The device according to the invention thus acts as a filter and cooler of milk, wherein by a favorable choice of the throw-away filter 13 the cooling is regulated. The milk, cooled in membranous state, will gather at the bottom of the cooling vessel 3 into a sump wherefrom milk is removed through outlet opening 10 and pipe 11. The pipe 11 forms a bend, the level of which is illustrated by reference numeral 12. The pipe 11 being made of elastic material such as rubber, plastic etc., the level of the plane 12 can be easily varied, whereby the detention time of the liquid in the sump will be controlled; this is also influenced by the selection of the throw-away filter 13. By selecting the shape of the cooling vessel 3 so that the relation of its cooling surfaces 4 to the volume of the cooling vessel 3 is sufficient, and a suitable filter 13 for each use, cooling is obtained by the regulation of the level 12 of the liquid, without stirring of milk; it has been established that this will eliminate the spontaneous lipolysis and have also otherwise a favorable influence on the final cooling of milk and on the result of storage in the bulk milk tank, to which the milk is led from the device.

It is clear that the number of the vessels 3 may be one or more and that their shape may vary. The vessels 3 are placed into the outdoor tank 9, which may be heat insulted. The vessels 3 hang freely on a supporting frame 6, and packings 7 are fitted between the edges, to insulate the space holding the spray pipes 5. Thus, any milk flowing over the edges of the cisterns cannot penetrate the spray pipe tank 9. There is an outlet opening or a pipe 8 for cooling liquid in the bottom of the spray pipe tank.

Owing to the fact that the cooling vessels 3 are detachably fitted into the spray pipe tank 9, cleaning of them can easily be carried out in a separate washing device. Also warm sterilization is possible without the risk that disinfectant would touch the milk.

In the device described above many factors may be varied by simple regulating means. One regulating means is the changing of the filter. As this is necessary even otherwise, this does not involve any extra expense. An essential fact is, however, that there are filters with different perviousness. Another regulating means is the regulation of the level of the bath in the vessel 3. In the way described this regulation is carried out with a very uncomplicated equipment.

The effects of the most important regulating means are listed below.

By regulating the level 12 of the precooled milk the following facts are influenced:
The level of the precooled milk in the cooling tank
The amount of the precooled milk in the milk bath
The detention time of the precooled milk in the milk bath
The area of the milk membrance on the cooling surface
The flowing distance of the milk as a membrance on the cooling surface.

By the filtration of the fresh milk the following facts are influenced:
The stopping time of the fresh milk in the cistern.
The filtration time of the fresh milk.
The flowing speed of the milk to be preheated, as a membrane on the cooling surface.
The thickness of the milk membrance to be precooled on the cooling surface.
The detention time of the precooled milk in the milk bath.
The velocity of stream of the precooled milk in the milk bath.
The velocity of flow of the precooled milk to the bulk milk tank.
The temperature of the milk to be cooled and stored in the bulk milk tank, during the flowing time.

Figure 3:
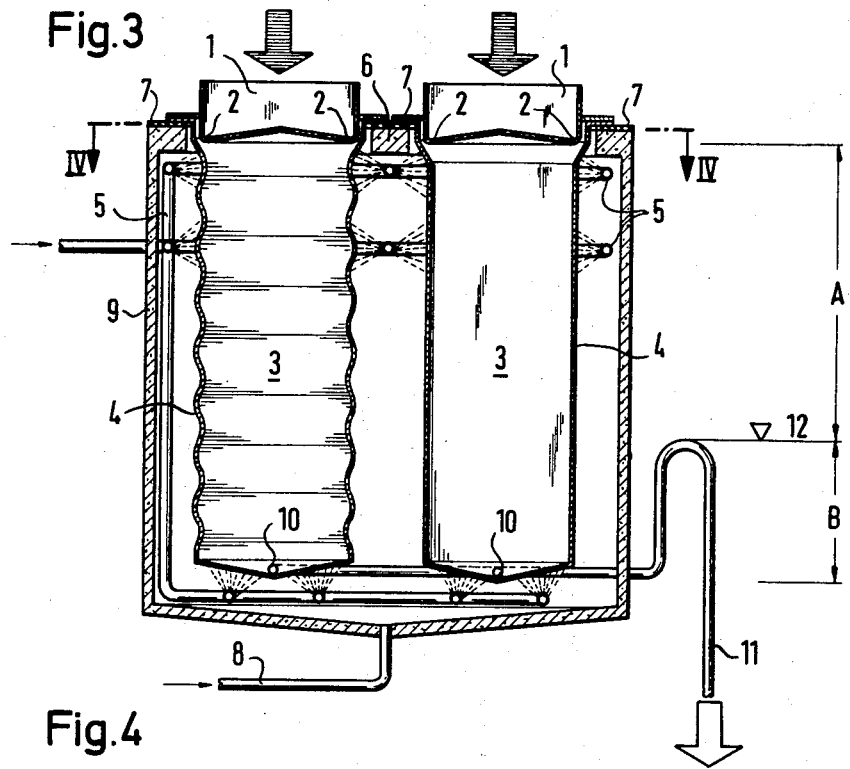
FIG. 3 shows a vertical section of the milk cooler according to a second embodiment along the line III—III of FIG. 4 which shows a section of FIG. 3 along the line IV—IV.
Figure 4:
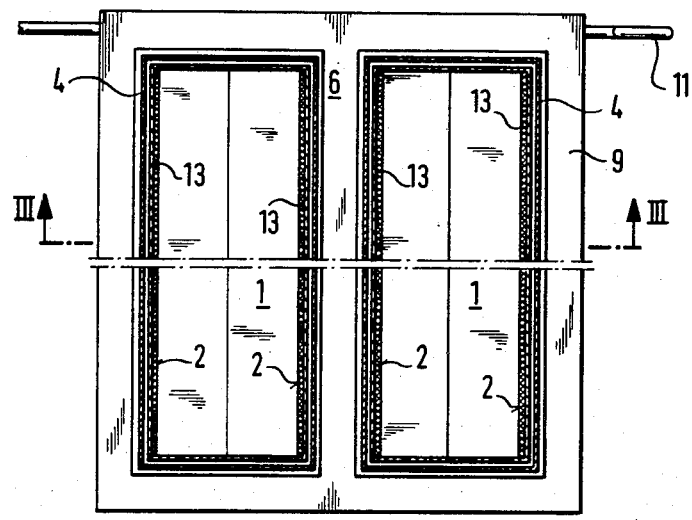
Figure 5:
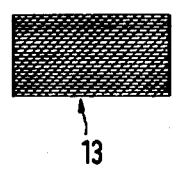
FIGS. 5, 6 and 7 show certain examples of crosscuts of throw-away filters applicable to all embodiments and to different cases of having different degrees of density imparting to them, a different perviousness for milk.
Figure 6:
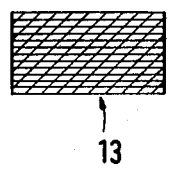
Figure 7:
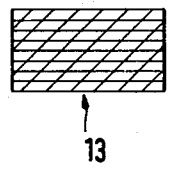

As shown in FIG. 3, the milk assumes the form of a flowing membrane for the distance A and a changing bath level for the distance B. In case B = 0, a kind of sheet cooler would be produced. In case A = 0, mainly a vertical cooler would be produced. Thus, the device is a combination of sheet cooler and upright can cooler by the regulation of the ratio A/B. It is to be observed that this regulation is possible also during the use. An additional factor in connection with the above-stated is that the part B is not the final stopping place of the milk, as the situation would be in the upright can cooler, on the contrary, it is a detention place or a passage area, where the detention time, the passage distance and the changes in temperature can be varied. From the bath, formed by part B, the milk is led to the bulk milk tank at desired velocity.

All the foregoing indicates that the invention involves many embodiments and regulating possibilities with uncomplicated technical equipment. Therefore, the details and the adaptations are not only limited to what has been stated above. Many other realizations are also possible within the scope of the claims.

I claim:
1. A device for cooling fresh milk comprising, in combination:
  1. a cistern for receiving the fresh milk, said cistern having peripherally extending narrow slit means;
  2. a throw-away milk filter having a selected perviousness to the milk, the filter being replaceably disposed adjacent, and substantially in contact with, the narrow slit means for regulating the amount of the fresh milk passing through the slit means as a function of the selected perviousness of the filter;
  3. a tightly closed milk collecting vessel disposed under, and covered by, the cistern, the vessel having an externally cooled outer wall with a cooled internal vertical surface in substantial alignment with the peripheral narrow slit means whereby the regulated amount of the fresh milk passing through the slit means flows down the cooled internal surface of the vessel in the form of a membrane;
  4. an outlet opening in the bottom of the cooled milk collecting vessel, said bottom forming a sump for collecting the cooled fresh milk; and
  5. a movable elastic outlet tube connected to the outlet opening for adjusting the level of the milk in the sump.

2. The mild cooling device of claim 1, further comprising spray means for a cooling liquid arranged outside the collecting vessel for cooling the vertical surface thereof.

3. The milk cooling device of claim 2, wherein the spray means is arranged to cool also the bottom of the vessel.

4. The milk cooling device of claim 1, wherein the vertical surface is corrugated.

5. The milk cooling device of claim 1, wherein the slit means is arranged in the lower edge of the cistern.

6. The milk cooling device of claim 1, further comprising a cooling tank and a plurality of said collecting vessels, each with said cistern, outlet opening and milk level adjusting means, arranged in said tank.

7. A device for cooling fresh milk comprising in combination:
  1. a cooling tank and a plurality of cooled milk collecting vessels, arranged in said tank, each vessel having a cistern;
  2. a horizontal supporting frame mounted on the tank for releasably hanging said collecting vessels on the frame and suspending them in the tank, and sealing means between the collecting vessels and the tank for preventing milk from spilling into the tank;
  3. said cisterns disposed for receiving fresh milk, said cisterns having peripherally extending slit means;
  4. milk filtering means disposed relative the slit means for regulating the amount of the fresh milk passing through the slit means;
  5. said cooled milk collecting vessels each having the cooled vertical surface in substantial alignment with the slit means whereby regulated amount of the fresh milk passing through the slit means flows down the cooled surface in the form of a membrane;
  6. an outlet opening in the bottom of the cooled milk collecting vessels, said bottom forming a sump for collecting fresh milk; and
  7. means connected to the outlet opening for adjusting the level of the milk in the sump.

* * * * *